Figure 5:
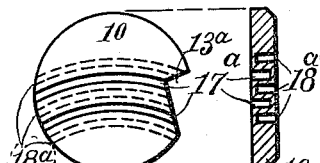

W. E. ELLIOTT.
CONTROLLING DEVICE FOR MACHINES.
APPLICATION FILED MAR. 8, 1915.

1,175,622.

Patented Mar. 14, 1916.
5 SHEETS—SHEET 1.

Witnesses
Howard H. Garrington
Mac Parkin

Inventor
William E. Elliott
By Moulton & Liverance
Attorneys.

W. E. ELLIOTT.
CONTROLLING DEVICE FOR MACHINES.
APPLICATION FILED MAR. 8, 1915.

1,175,622.

Patented Mar. 14, 1916.
5 SHEETS—SHEET 2.

Witnesses
Howard H. Carrington
Mae Parkin

Inventor
William E. Elliott
By Moulton & Liverance
Attorneys.

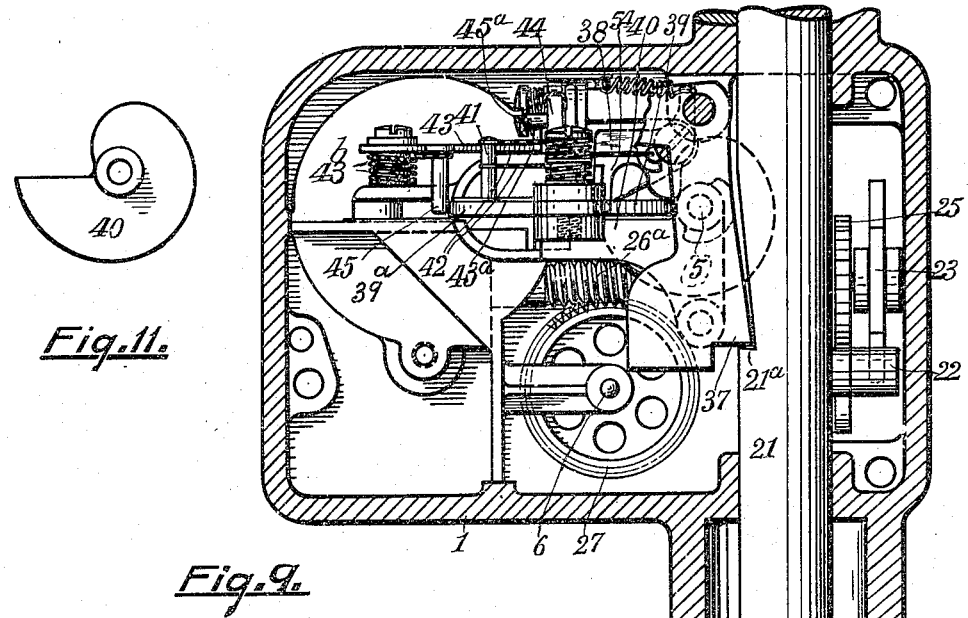
Fig. 11.
Fig. 9.
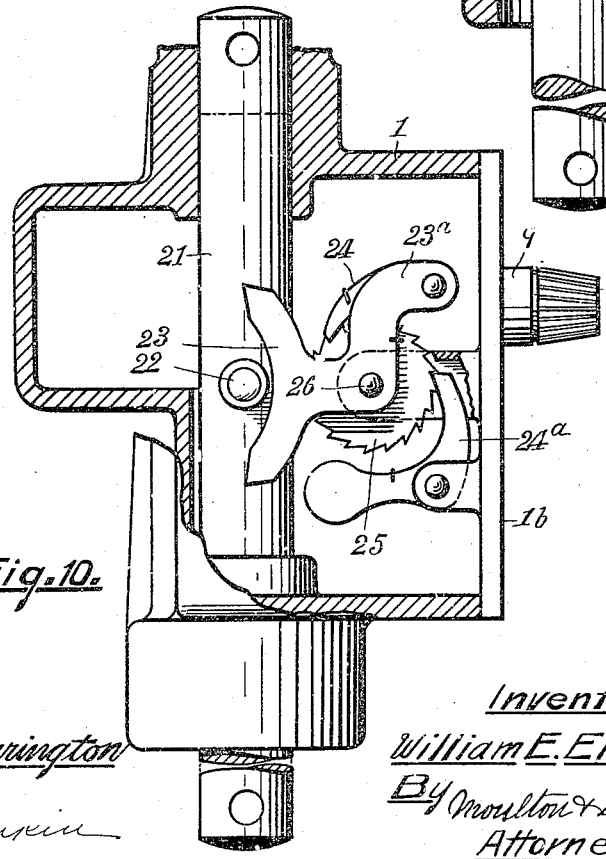
Fig. 10.

W. E. ELLIOTT.
CONTROLLING DEVICE FOR MACHINES.
APPLICATION FILED MAR. 8, 1915.
1,175,622.
Patented Mar. 14, 1916.
5 SHEETS—SHEET 4.
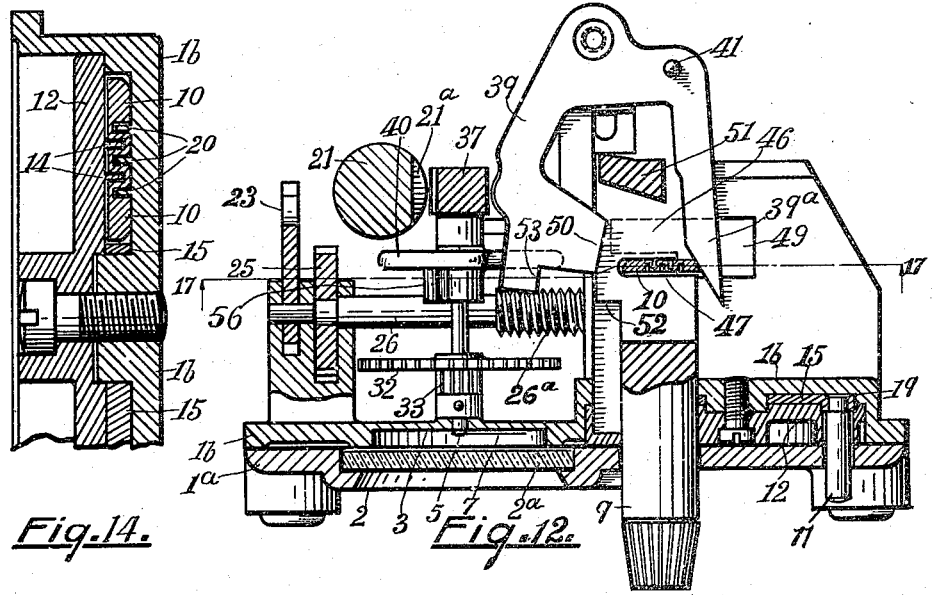
Fig.14.    Fig.12.
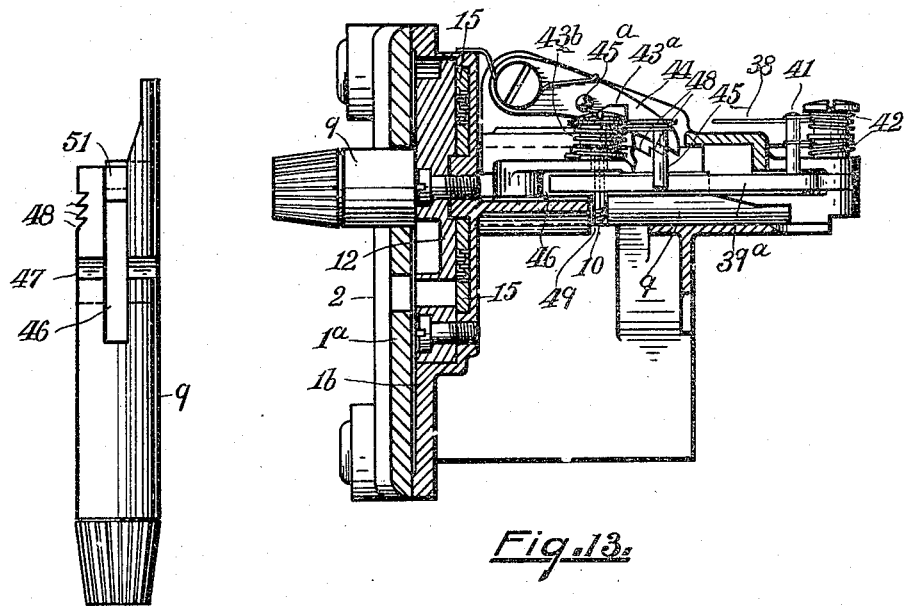
Fig.13.
Fig.15.
Witnesses
Howard H. Garrington
Mae Rankin
Inventor
William E. Elliott
By Moulton & Liverance
Attorneys.

UNITED STATES PATENT OFFICE.

WILLIAM ELIJAH ELLIOTT, OF GRAND RAPIDS, MICHIGAN.

CONTROLLING DEVICE FOR MACHINES.

1,175,622.   Specification of Letters Patent.   Patented Mar. 14, 1916.

Application filed March 8, 1915. Serial No. 12,907.

*To all whom it may concern:*

Be it known that I, WILLIAM ELIJAH ELLIOTT, a citizen of the United States of America, residing at Grand Rapids, in the county of Kent and State of Michigan, have invented certain new and useful Improvements in Controlling Devices for Machines; and I do hereby declare the following to be a full, clear, and exact description of the invention, such as will enable others skilled in the art to which it appertains to make and use the same.

My invention relates to improvements in controlling devices for machines; more particularly for machines for securing buttons to shoes; and its object is to provide means for locking the machine after it has performed a predetermined number of operations, means for unlocking the machine to permit further operation of the same, means for retaining the unlocking key in a sealed receptacle after it has been used to unlock the machine, means for safeguarding the machine against fraudulent unlocking of the same, and to provide the device with various new and useful features hereinafter more fully described and particularly pointed out in the claims.

Figure 4:
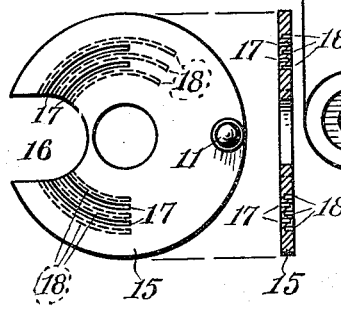
Figure 1:
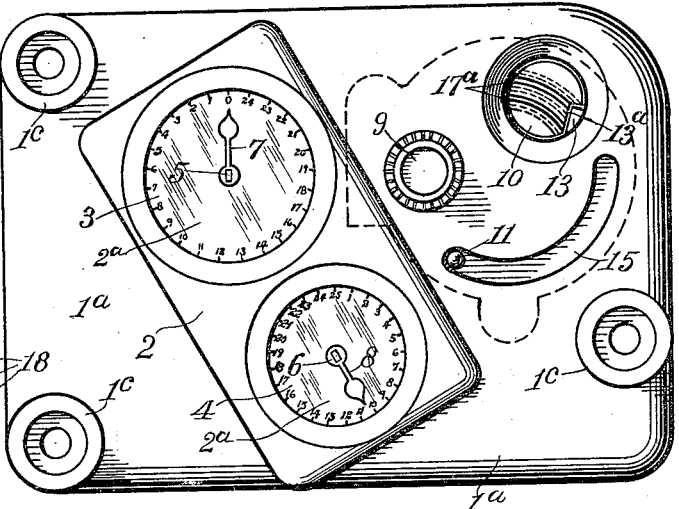
Figure 3:
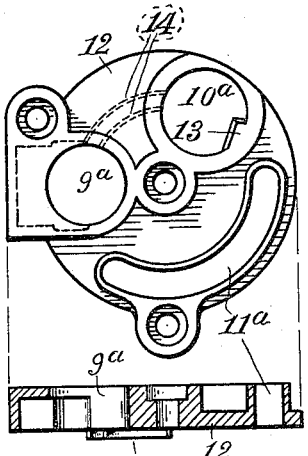
Figure 2:
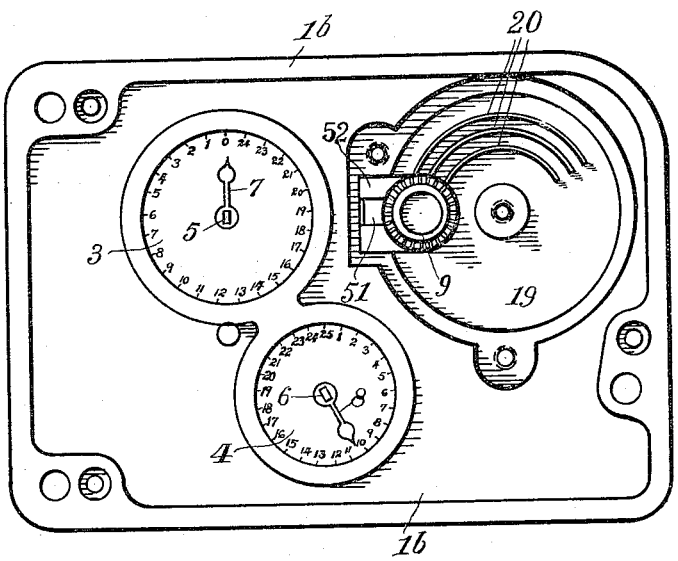
Figure 6:
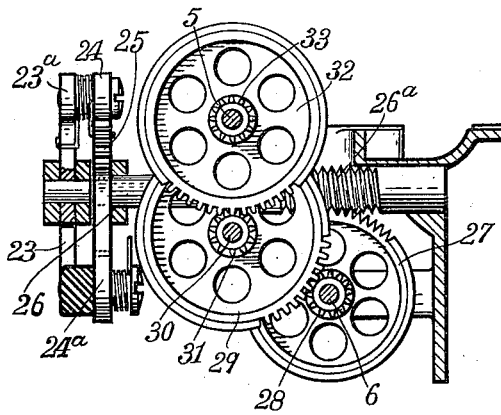
Figure 7:
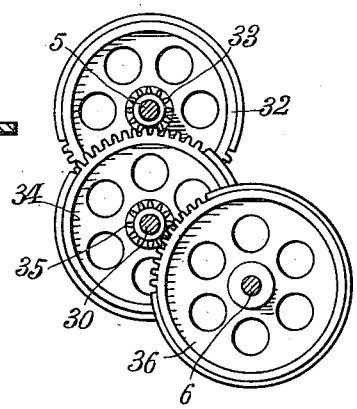
Figure 8:
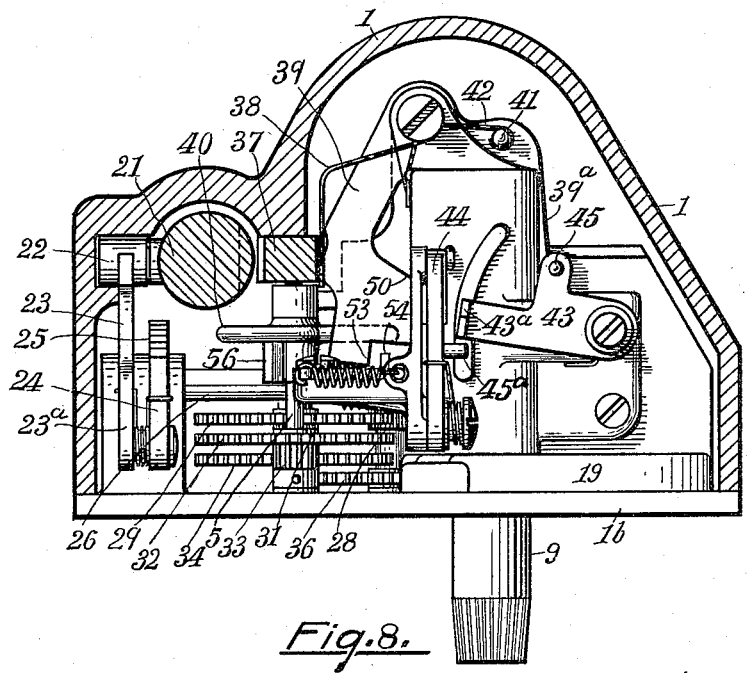
Figure 16:
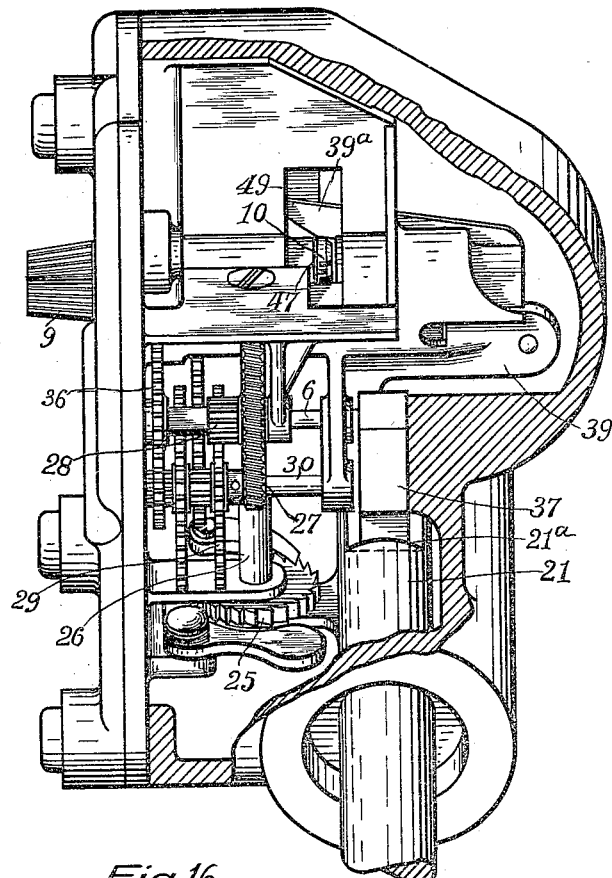
Figure 17:
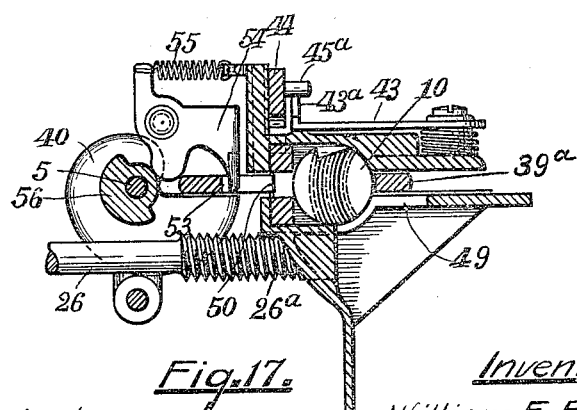

My invention consists essentially of a locking member adapted to hold a machine from operating; mechanism to indicate the number of times the predetermined number of operations have been performed by the machine; means for automatically moving the locking member to operative position when the machine has been operated a predetermined number of times, to prevent further operation of the machine; means for moving the locking member out of operative position to release the machine, comprising a suitable key, a pusher to receive the key and carry the same into operative position, a housing inclosing the mechanism into which housing the key drops after releasing the machine, transfer means to receive the key and convey it into the pusher, and mechanism to prevent unlocking the device by means other than a key especially adapted for the purpose; and in various features of construction and arrangement, as will more fully appear by reference to the accompanying drawings showing a preferred embodiment of my invention, in which;

Figure 1 is an elevation of an outer removable front plate or closure for the housing; Fig. 2 an elevation of an inner plate for the housing, on which plate the mechanism of the device is mounted; Fig. 3 a detail of an intermediate plate between the outer and inner plates; Fig. 4 a detail of the transfer disk; Fig. 5 an enlarged detail of the key; Fig. 6 a detail of the mechanism for operating the indicating and locking mechanism; Fig. 7 a detail of the gearing to operate an index to show how many times the machine has been operated the predetermined number of times and locked; Fig. 8 a plan view of the mechanism of my device; Fig. 9 an elevation illustrating a portion of the device with the machine locked as at the end of a predetermined number of operations; Fig. 10 a detail in elevation of a portion of the mechanism illustrated partially in Fig. 6; Fig. 11 a detail of the cam wheel 40; Fig. 12 a detail in sectional plan view of a portion of the device illustrating the unlocking operation; Fig. 13 a detail partially in section showing the means for holding the pusher during the operation of the machine; Fig. 14 an enlarged sectional detail taken through a key and adjacent parts shown as when the key is being transferred from the receiving opening in the housing to the pusher; Fig. 15 a detail of the pusher; Fig. 16 an underside view of the device with the key in the pusher; and Fig. 17 a sectional detail on the line 17—17 of Fig. 12.

Like numbers refer to like parts in all of the figures.

1 represents a suitable housing to inclose the mechanism and to retain the keys used to unlock the device. Extending through this housing and reciprocable longitudinally therein, is a rod 21 to operate or control any convenient machine, preferably a machine for attaching buttons to shoes, but obviously my device may be applied to any machine having a movable controlling member. This rod is provided with a shoulder 21$^a$ and pivoted in the housing is a locking dog 37 to engage said shoulder and prevent further movement of the rod. This dog is normally held out of action by a spring 38 and is engaged with the shoulder 21ª at the end of a predetermined number of oscillations of the rod as hereinafter explained. The housing is closed by an outer front plate 1ª secured in place by suitable bolts or screws, the heads of which are surrounded by bosses 1ᶜ on this plate whereby said heads may be suitably sealed to prevent unauthorized opening of the housing. This plate 1ª is provided with a raised panel 2 in which is a glass plate 2ª opposite openings in the panel through which may be seen dials 3 and 4 in the plate 1ᵇ and suitably numbered, (preferably, 0 to 25).

In the axis of the dial 3 is a shaft 5 carrying an index 7 and in the axis of the dial 4 is a shaft 6 carrying an index 8. The plate 1ª has a suitable opening through which projects a pusher 9 for the key; another opening suitably located to receive the key 10, and a segmental opening through which projects a pin 11 for manually adjusting a transfer disk 15. Behind this outer plate 1ª is an inner plate 1ᵇ having the described dials 3 and 4 opposite the respective openings in the panel of the outer plate. This inner plate is also provided with a recess 19 to receive the transfer disk 15, together with intermediate plate 12 having openings 9ª, 10ª and 11ª opposite the described similar openings in the outer plate 1ª. In this recess 19 and behind the intermediate plate is a rotary transfer disk 15 carrying the pin 11 and manually shifted thereby.

To rotate the indexes 7 and 8 and to lock the rod 21 after the machine has been operated a predetermined number of times, (preferably as indicated by one revolution of the index 7), I provide a stud or projection 22 on the rod 21 which as the rod moves up and down alternately engages the respective ends of a bifurcated rocker arm 23 pivoted on the end of a shaft 26 and having an extension 23ª on which is mounted a pawl 24 which engages a ratchet wheel 25 fixed on the shaft 26 to rotate the shaft step by step, which ratchet wheel is held from backward movement by a holding pawl 24ª. Thus at each reciprocation of the rod 21 the ratchet wheel is moved forward one tooth.

On the shaft 26 is a worm or screw 26ª engaging a worm gear 27 freely rotative on the shaft 6 and having attached a pinion 28 engaging a gear 29 mounted on an idler shaft 30 and carrying a pinion 31 engaging a gear 32 fixed on the shaft 5 to rotate the same. This ratchet wheel, worm, and train of gearing are proportioned so that the index 7 will rotate once to a predetermined number of oscillations of the rod 21, (preferably 25,000 times for the specific use intended); but obviously this train may be modified to rotate the index 7 once to any other preferred number of operations or oscillations of the said rod.

When the machine to which this device is attached has been operated the predetermined number of times the locking dog 37 is engaged with the shoulder 21ª and the rod is locked, further operation of the machine thus being prevented until the rod is released.

To indicate the number of times that the machine has been operated, the predetermined number of times (25,000 as shown), the shaft 5 is connected to the shaft 6 carrying the index 8 by a train of gearing shown in Fig. 7. A pinion 33 is fixed on the shaft 5 and engages a gear 34 rotative on the shaft 30, said gear having rotative therewith a pinion 35 engaging a gear 36 fixed on the shaft 6 and these gears and pinions are so proportioned that one revolution of the shaft 6 occurs to 25 revolutions of the shaft 5, and each dial is divided and numbered in twenty-five equal spaces for the particular use intended. Thus the index 8 will show on the dial how may times 25,000 operations have been performed by the machine and the number of keys that should be found in the housing when the same is opened, and the index 7 will show how many thousand oscillations of the rod have occurred less than twenty-five thousand.

To engage the dog 37 with the shoulder 21ª on the rod 21, a pivoted arm 39 is swung against the dog by springs 42 with sufficient force to overcome the spring 38 and move the dog into engagement with the shoulder 21ª. During the operation of the machine, however, this arm is held out of engagement with the dog, first by means of the key, as hereafter described, and thereafter by means of a cam wheel 40 fixed on the shaft 5. The edge of this wheel 40 is of increasing radius from the starting point of contact with the arm to once around the axis thereof, and terminates abruptly in a radial drop toward the axis. When that portion of the wheel having the least radius is opposite the arm 39, said arm will be permitted to swing against the dog 37, thus locking the machine.

To unlock the machine a key 10 in the form of a disk is provided and the arm 39 is provided with a second arm 39ª rigid therewith, extending substantially parallel with the same and spaced apart therefrom. Between these arms is provided a longitudinally movable pusher 9 having a longitudinal slot 46 through its axis to receive these arms as they are swung into the same, and also having a transverse slot 47 in one side to receive the key. When the pusher is moved inward with a key therein the edge of the key engages the inclined end of the arm 39ª and swings the arm outward, thus moving the arm 39 out of contact with the dog 37, and permitting the spring 38 to disengage the dog from the shoulder 21ª. As the arm 39 swings toward the pusher an inwardly projecting portion 50 thereof moves into the slot 46 to engage and remove the key from the pusher as hereinafter described. This portion 50 also projects into the path of the bridge 51 in the pusher and prevents withdrawal of the same if the detent 44 should not operate. When the pusher has been moved inward sufficiently to cause the key to release the rod 21, a detent 44 will engage a tooth 48 in the pusher and hold the same from being withdrawn.

As the machine is operated the cam wheel 40 is slowly rotated and will soon engage the arm 39 moving the same toward the key 10 and the arm 39ª away from the same, the key is thus pushed out of the transverse slot 47 until it will fall through an opening 49 into a chamber in the lower part of the housing 1. When a complete revolution of the cam 40 has occurred, the portion of the said cam of least radius again comes opposite the arm 39, and the springs 42 attached to the pin 41 in the arm 39ª will now swing the arm 39 against the dog 37 and engage the same with the shoulder 21ª, thus locking the rod 21, to prevent further operation of the machine. To release the pusher so that the same may be drawn outward to bring the recess 47 in the plane of the disk 15 to receive another key, a pivoted arm 43 carries on its movable end a lifting cam 43ª adapted to engage a pin 45ª in the detent 44 and lift the detent out of engagement with the pusher. This however, can occur only when the arm 39 has engaged the dog 37 and the arm 39ª has swung into the pusher and away from the pin 45 thus allowing a spring 43ᵇ to move the lifting cam 43ª under the pin 45ª. When the key engages the arm 39ª and swings the same outward, this arm engages the pin 45 and moves the lifting cam 43ª from beneath the pin 45ª allowing the detent 44 to engage and hold the pusher. When the pusher is withdrawn to the limit of its outward movement, a shoulder 52 on the pusher engages the plate 12 and the slot 47 will then be in the plane of the disk 15 and in position to receive the key. The disk 15 extends into the slot 47 in the pusher and has a recess 16 in its edge, and as the pin 11 traverses the segmental slot in the outer and intermediate plates this recess is moved to receive the pusher 9 when in one position and to receive the key 10 when in the other position. It will be noted that when the disk is in position to receive the key the pusher is locked by it in outward position, and when the disk is turned to the other position the key is carried into the slot 47 in the pusher and the pusher released to be moved inward and when so moved the disk is then locked in this position and effectually closes the opening in the plates adapted to receive the key.

To prevent the use of a plain disk and to render it necessary to use a key of special construction and none other, the bottom of the recess 19 is provided with segmental tongues 20 spaced apart and concentric with the axis of the disk and the rear of the intermediate plate 12 is provided with similar segmental tongues 14 extending between the tongues 20 and spaced apart from the same. The transfer disk 15 is provided with segmental grooves 17 and 18 in its respective sides to freely receive the described segmental tongues 14 and 20 and of greater length than the same to permit the disk to rotate about its axis to a suitable extent to receive the key, and to transfer the same to the pusher. The key is in the form of a disk of substantially the same thickness as the transfer disk and of slightly less diameter than the opening in the plates 1ª and 12 adapted to receive the key. This key is also provided with segmental grooves 17ª and 18ª in its respective sides to freely receive the tongues 14 and 20 on the plates 12 and 1ᵇ and to insure proper position of the key when inserted in the plane of the disk, a triangular lug 13 having one radial side and one side at substantially right angles thereto, projects into the key receiving opening 10ª in the plate 12 and the key is suitably recessed in its margin to fit this lug as at 13ª whereby the key must be inserted in the disk in proper position to receive the tongues 20 in the grooves 18ª, and the tongues 14 in the grooves 17ª. When so positioned in the plane of the transfer disk 15, the disk and key can then be turned about the axis of the disk by means of the pin 11 and the key will traverse between the plates 12 and 1ᵇ with the tongues on the plates slidable in the grooves of the key and the key will be carried around by the disk into the pusher 9. By the described construction a plain disk or other like object can not be inserted and carried around into the pusher, thus guarding against the use of anything but the required key of especial construction.

In operation, the index 7 shows what part of a revolution the cam has made and how many thousand times the plunger has been operated, and when the cam has made a complete revolution the machine is automatically locked and the key has been dropped into the housing, which housing is sealed by suitable seals in the bosses 1ᶜ, preferably as shown by my co-pending application of even date herewith. At this time the machine is automatically locked and the pusher automatically released, which can now be drawn out to receive another key. This releases the disk which can now be turned to receive a key which now locks the pusher until a key is supplied to the disk and the same turned to carry the key into the pusher. This releases the pusher and effectually closes the key receiving opening in the front plates. The pusher may now be manually moved inward which locks the transfer disk and unlocks the machine for further operation. During this operation the pusher remains locked and retains the disk in locked position and the key is dropped out of the pusher into the housing, the machine being operable until the predetermined number of operations is accomplished whereupon it is again locked. At every complete cycle of the predetermined number of operations the index 8 is advanced one number on the dial, thus indicating the number of keys that have been used, which keys should be found in the housing upon breaking the seals and opening the housing. To guard against premature discharge of the key from the pusher, which may occur in a machine in handling or transporting the same, a shoulder 53 is provided in the arm 39 which shoulder is engaged by a detent 54 held in engagement by a spring 55. This detent prevents the arms 39 and 39ª from moving sufficiently to release the key. When the machine is in operation and the cam wheel 40 begins to move said arms to release the key, a cam 56 on the shaft 5 engages the detent 54 and raises the same out of operative position, thus releasing the arms 39 and 39ª and when the cam wheel 40 releases the arms to lock the machine, the cam 56 also releases the detent 54, this again limiting the movement of the said arms.

By this device I am able with certainty to control the use of a machine and guard against unlicensed use of the same, the license for use the predetermined number of times being accompanied by delivery of a key to the licensee, who must necessarily deliver the key into the machine and lock the same against further use when he has exhausted his license privilege. To further guard against using bogus or fraudulent keys, all of these keys may be registered and numbered consecutively, and the numbers on the keys found in the housing when opened compared with the registered key numbers.

What I claim is:—

1. In a controller, in combination with a locking dog to hold a machine, means for moving the dog to inoperative position, a manually operated pusher adapted to carry a key, a manually operated transfer member adapted to receive the key and deposit the same in the pusher and means for moving the dog to operative position, said means being made ineffective by the key in the pusher.

2. In a controller, in combination with a locking dog to hold a machine, means for moving the dog to inoperative position, means for moving the dog to operative position, a manually operated pusher adapted to carry a key and render said last mentioned means ineffective, and a manually rotated disk to receive the key and transfer the same to the pusher.

3. In a controller, in combination with a locking dog to hold a machine, means for moving the dog to inoperative position, a manually operated pusher having a slot to receive a key, a rotative disk having its periphery extending within said slot and provided with a recess in its periphery to receive the key and the pusher, and to permit the pusher to move longitudinally therein, means for manually shifting the position of the disk and means for moving the dog to operative position, said means being carried to inoperative position by the pusher with a key in its slot.

4. In a controller, in combination with a locking dog to hold a machine, means for moving the dog to inoperative position, means for moving the dog to operative position, a longitudinally movable pusher having a transverse slot adapted to receive a key, a rotary disk arranged with its periphery extending within the slot, and also having a recess in its periphery to receive the key and pusher and to permit the pusher to move longitudinally therein, said pusher with a key therein operating to render the means for moving the dog to operative position ineffective, and a housing inclosing the disk and pusher, said housing being provided with an opening opposite the disk to admit the key, and an opening through which the pusher projects, and means for manually rotating the disk alternately from a position to receive the key, to a position to deliver the key into the pusher.

5. In a controller, in combination with a locking dog to hold a machine, means for moving the dog to inoperative position, means to move the dog to operative position controlled and made ineffective by a key, a longitudinally movable pusher having a transverse recess to receive the key, a rotary disk having its periphery in the said recess and a recess in its periphery to receive the key and pusher, a housing having an opening to receive the key and an opening spaced apart therefrom in which the pusher is slidable, and means for manually shifting the disk with its recess opposite the respective openings whereby when the disk is in position to receive the key the pusher is locked and when the pusher is moved longitudinally the disk is locked by the pusher and the receiving opening closed by the disk.

6. In a controller, in combination with a locking dog to hold a machine, a spring to move the dog to inoperative position, a pivoted arm to engage the dog and move the same to operative position, a spring to operate the arm, a second arm projecting rigidly from the first named arm, and spaced apart therefrom and a pusher having a transverse slot adapted to receive a key to engage the second arm to move the first arm away from the dog and permit the dog to move to inoperative position.

7. In a controller, in combination with a locking dog to hold a machine, a pivoted arm to move the dog to operative position, a second arm projecting rigidly from the first arm and spaced apart therefrom, a pusher longitudinally movable between the arms having a longitudinal slot to receive the arms and a transverse slot to receive the key, means for inserting a key in the pusher, and a cam wheel to engage the first arm and move the same into the pusher to discharge the key therefrom.

8. In a controller, in combination with a locking dog to hold a machine, a pivoted arm to move the dog to operative position, a second arm moving with the first arm and spaced apart therefrom, a pusher longitudinally movable between the arms and having a longitudinal slot to receive an arm and a transverse slot to receive a key to engage the second arm and move the first arm away from the dog, a detent to hold the pusher, a cam wheel to move the first arm into the pusher and discharge the key therefrom and means for detaching the detent from the pusher when the cam wheel releases the arm.

9. In a controller, in combination with a locking dog to hold a machine, an arm to engage the dog and move the same to operative position, a second arm movable therewith and spaced apart therefrom, a pusher longitudinally movable between the arms, having a longitudinal slot to receive the arms and a transverse slot to receive a key adapted to engage the second arm and move the arms away from the dog, a detent to engage and hold the pusher, a pivoted arm having a cam to disengage the detent, said arm moved to inoperative position by the second arm, a cam wheel to move the first arm into the pusher and discharge the key therefrom and to release the arms when it has made one revolution whereby the dog will move to operative position and the pusher will be released.

10. In a controller, in combination with a locking dog to hold a machine, a movable arm to move the dog to operative position, a pusher having a longitudinal slot to receive the arm and a slot to receive a key to move the arm and release the dog, a cam wheel to engage the arm and move the same into the slot to discharge the key from the pusher, a detent to engage and hold the arm to prevent premature discharge of the key, and a second cam to move the detent to inoperative position while the arm is discharging the key from the pusher.

11. In a controller, in combination with a locking dog to hold a machine, a movable arm to move the dog to operative position, a second arm projecting rigidly from the first named arm, a pusher having a longitudinal slot to receive the arms and a transverse slot to receive a key to engage the second arm, a detent to hold the pusher, a movable arm carrying a cam to disengage the detent and moved to inoperative position by the second arm, a cam to move the first arm into the pusher and discharge the key therefrom, a detent to hold the first arm, and a second cam to move the detent to inoperative position, and permit the first named cam to move the arm.

12. In a controller, a housing, an outer removable plate having openings therein, an inner removable plate, a longitudinally movable pusher projecting through the plates, a rotative disk between the plates and having its periphery in a slot in the pusher, and a recess in its periphery to receive a key and the pusher, the outer plate also having an opening to receive a key and a segmental slot, and a pin in the disk traversing the slot to manually move the disk to receive a key and to transfer the same to the pusher.

13. In a controller, a housing, an outer removable plate to the same, said plate having an opening to display a dial, an opening to receive a key, an opening to receive a pusher, and a segmental slot to receive a pin; an inner plate having a dial opposite the dial opening in the outer plate, also having a recess for a transfer disk, a transfer disk in the recess having a recess in its periphery to receive a key, and a pin in the disk traversing the segmental slot in the outer plate to manually shift the disk with the recess therein alternately opposite the key opening and the pusher opening.

14. In a controller, in combination with a reciprocable rod, a locking dog to engage and hold said rod, a movable arm to move the dog to operative position, means for manually moving the arm to release the dog, a rotative shaft, means for slowly rotating the shaft operated by the rod, a cam on the shaft having its periphery arranged to engage the arm and hold it out of engagement with the dog and also to release the arm when the cam has made a complete revolution to permit the arm to move the dog to operative position.

15. In a controller, in combination with a reciprocable rod, a locking dog to engage and hold the rod, a pusher adapted to receive and carry a key, to move the arm and release the dog, a rotative shaft, a cam on the shaft having a periphery of increasing radius to engage the arm and move it to discharge the key from the pusher and to release the arm at the completion of one revolution, means for slowly rotating the shaft operated by movement of the rod and an index on the shaft to indicate its rotary movement.

16. In a controller, in combination with a reciprocable rod and a locking dog to engage and hold the rod, a pivoted arm to engage the dog and move the same to operative position, a pusher having slots therein to respectively receive the arm and a key, and adapted to move the arm by means of the key to release the dog, a rotative shaft, a cam on the shaft to engage the arm and move the same to discharge the key from the pusher, a detent to hold the arm until the cam moves the same, a second cam on the shaft to move said detent to inoperative position while the first cam is moving the arm, said cams being arranged to release the arm and the detent at the termination of one complete revolution of said shaft.

17. In a controller, in combination with a movable rod and a locking dog adapted to engage and hold the rod, a spring to move the dog to inoperative position, a pivoted arm to move the dog to operative position, a spring to operate the arm, a rotative shaft, a cam on the shaft to hold the arm inoperative during one revolution of the shaft and to then release the arm to permit it to move the dog to operative position, an index on the shaft and means operated by the rod for rotating the shaft once to a predetermined number of movements of the rod.

18. In a controller, in combination with a reciprocable rod, and a locking dog to engage and hold the rod, a movable arm to move the dog to operative position, a rotative shaft, a cam on the shaft to engage and hold the arm out of contact with the dog and release the same at the end of a complete revolution of the cam, a stud on the rod, a rocker arm oscillated by the stud, a pawl on said arm, a ratchet wheel engaged by the pawl, a shaft carrying the ratchet wheel, and gearing connecting said shafts whereby the cam shaft is rotated once to a predetermined number of movements of the rod.

19. In a controller, in combination with a reciprocable rod and a locking dog to engage and hold the rod, means for moving the dog into and out of operative position comprising an arm to engage the dog and move the same to operative position, a rotative shaft carrying a cam to move the arm and release the dog to permit a predetermined number of reciprocations of the rod, a housing inclosing said means through which the end of the shaft projects, an index on the end of the shaft, a dial on the housing traversed by the index and means operated by the rod for slowly rotating the shaft.

20. In a controller, in combination with a reciprocable rod, and a locking dog to engage and hold the rod, means for controlling the dog, comprising a rotative shaft, a stud on the rod, a rocker arm oscillated by the stud, a pawl on the arm, a ratchet wheel engaged by the pawl, a shaft carrying the wheel, a worm on the shaft and gearing connecting the worm and first named shaft whereby the shaft rotates once to a predetermined number of reciprocations of the rod, a second shaft geared to the first shaft to rotate once to a predetermined number of rotations of the first shaft, a housing through which said first and second shafts project, an index on the outer end of each shaft and a dial on the housing opposite each index and traversed thereby.

In testimony whereof I affix my signature in presence of two witnesses.

WILLIAM ELIJAH ELLIOTT.

Witnesses:
FRANK E. LIVERANCE, Jr.,
H. H. YARRINGTON.

Copies of this patent may be obtained for five cents each, by addressing the "Commissioner of Patents, Washington, D. C."